Figure 1:
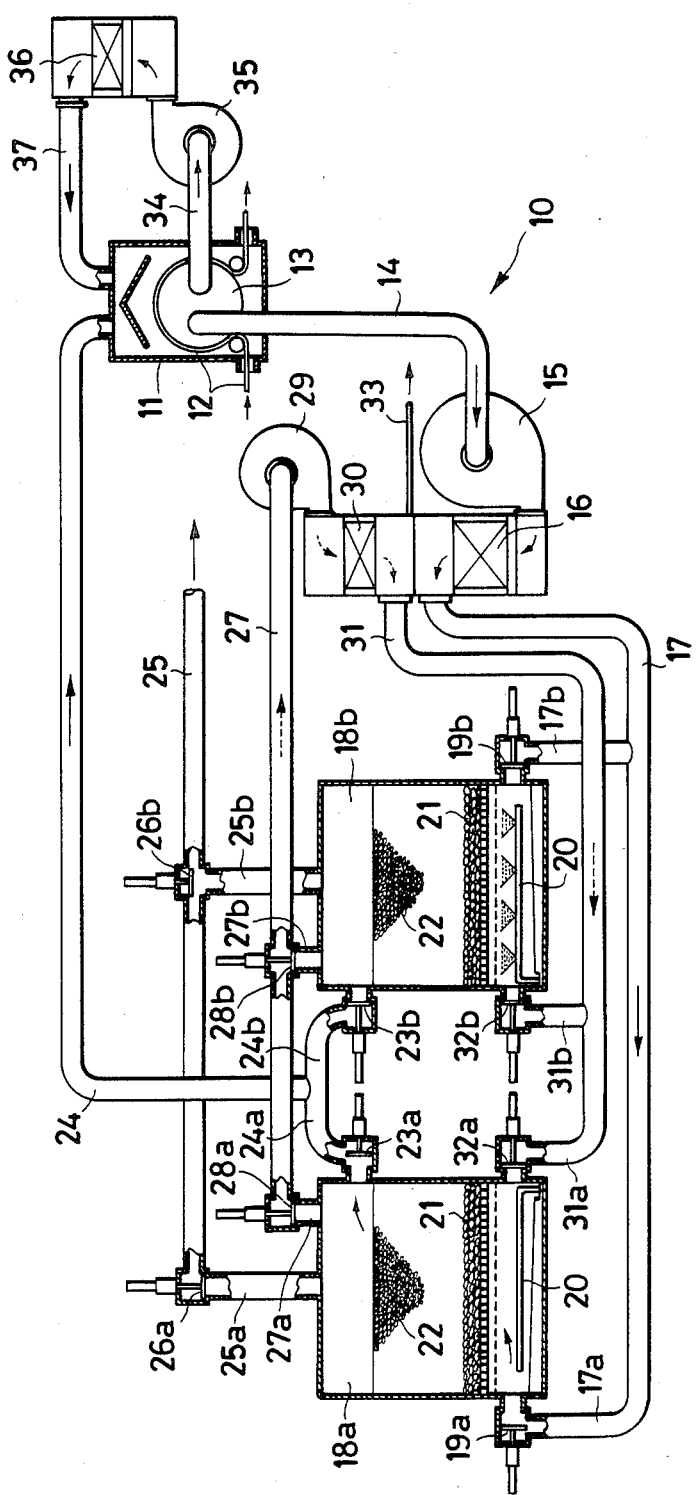

United States Patent [19]

Vecchia

[11] Patent Number: 4,729,177

[45] Date of Patent: Mar. 8, 1988

[54] EQUIPMENT FOR THE DEODORIZATION OF THE FABRIC IN MACHINERY FOR TEXTILE PROCESSING

[75] Inventor: Gino D. Vecchia, Santorso, Italy

[73] Assignee: Sperotto Rimar S.p.A., Zane, Italy

[21] Appl. No.: 924,607

[22] Filed: Oct. 29, 1986

[30] Foreign Application Priority Data

Nov. 21, 1985 [IT] Italy ............................. 22928 A/85

[51] Int. Cl.⁴ .......................................... F26B 13/08
[52] U.S. Cl. ........................................ 34/77; 34/80; 34/115
[58] Field of Search .................. 68/18 F; 34/115, 77, 34/82, 80, 66

[56] References Cited

U.S. PATENT DOCUMENTS

| 4,328,626 | 5/1982 | Leitner | 34/115 |
| 4,413,426 | 11/1983 | Graff | 34/80 |
| 4,513,590 | 4/1985 | Fine | 68/18 F |

Primary Examiner—Larry I. Schwartz
Attorney, Agent, or Firm—Hedman, Gibson, Costigan & Hoare

[57] ABSTRACT

The object of the present invention is an equipment provided with a fabric deodorization loop and a fabric cooling loop, both of which are connected in closed loop to the container into which the fabric is delivered, and an activated charcoal cooling loop, it too being a closed loop, connected to the filters of the deodorization loop.

7 Claims, 2 Drawing Figures

EQUIPMENT FOR THE DEODORIZATION OF THE FABRIC IN MACHINERY FOR TEXTILE PROCESSING

The present invention relates to an equipment for the deodorization of the fabric in machinery for textile processing.

Submitting the fabrics leaving plants, wherein they are treated with solvents, to operations of so-called deodorization, for the removal and the recovery of said solvents, is known.

For example, downstream the machinery for the washing and the finishing of the fabrics, special devices are installed, for the deodorization of the fabric, and the recovery of the solvent, which are composed by a first deodorization loop and by a second, cooling, loop, both of them being generally connected with the outer environment.

The first, deodorization, loop, sucks ambient air through the fabric, makes it pass through activated charcoal filters, wherein the solvent is adsorbed, and vents it to the outside, by means of a stack, with contemporaneous recovery of the condensed solvent.

The second loop acts on a subsequent, already deodorized, fabric portion, by sucking, and in this case too, making ambient air pass through said portion, said ambient air cooling the fabric, and being vented, it too, to the outer environment, through the said stack.

In the so-structured devices, a continuous drawing occurs of the ambient air, said air being vented to the outside, with a continuous waste of heat for the heating of the same premises.

Furthermore, the venting to the outside of the process air, even if it undergoes the filtration, does not overcome completely the problem of the pollution, which may always occur due to a loss in effectivity of filters, or to other unexpected operation faults.

An example of pollution may be that which occurs when the filter starts the adsorption step. In fact, the filter, as soon as it leaves the distillation step, is at a temperature close to 100° C., and is saturated with steam, with residual amounts of solvent vapours. Under such conditions, the adsorption efficiency of the activated charcoal drops considerably, until the same air which is absorbed has suitably cooled and dried it. As a consequence, during the first minutes of the adsorption step, the air discharged to the outside, besides being saturated with steam, has a content of solvent equal to and sometimes higher than the maximum limit allowed by the law in force in point of atmospheric pollution.

Such short-time emission peaks, were tolerated in the past, because they could influence to a minimum extent only the average value of emission during the step, but limitations recently introduced in the immission limits impose a solution to be found to this problem.

A purpose of the present invention is to solve the above said problems, by eliminating both the causes of possible pollution and the wastes caused by the heating of the ambient air, which is continuously changed.

Such a purpose is achieved according to the invention by providing an equipment for the deodorization of fabric, and the recovery of solvents contained in it, in machines for textile processing, essentially comprising a main fan, connected on one side to a piping for sucking air through the fabric, and on the other side to a piping for delivering the sucked air towards activated charcoal filtering elements, these latter being connected in their turn to a vent piping, and at least a piping being provided for the removal of the said recovered solvent, characterized in that both said piping of sucking through the fabric and said outlet piping from the said filtering elements are connected, in closed loop, to an air distribution element, through which said fabric is made pass, each one of the said filtering elements being furthermore connected, through related suction and delivery pipings, to a second fan.

Figure 2:
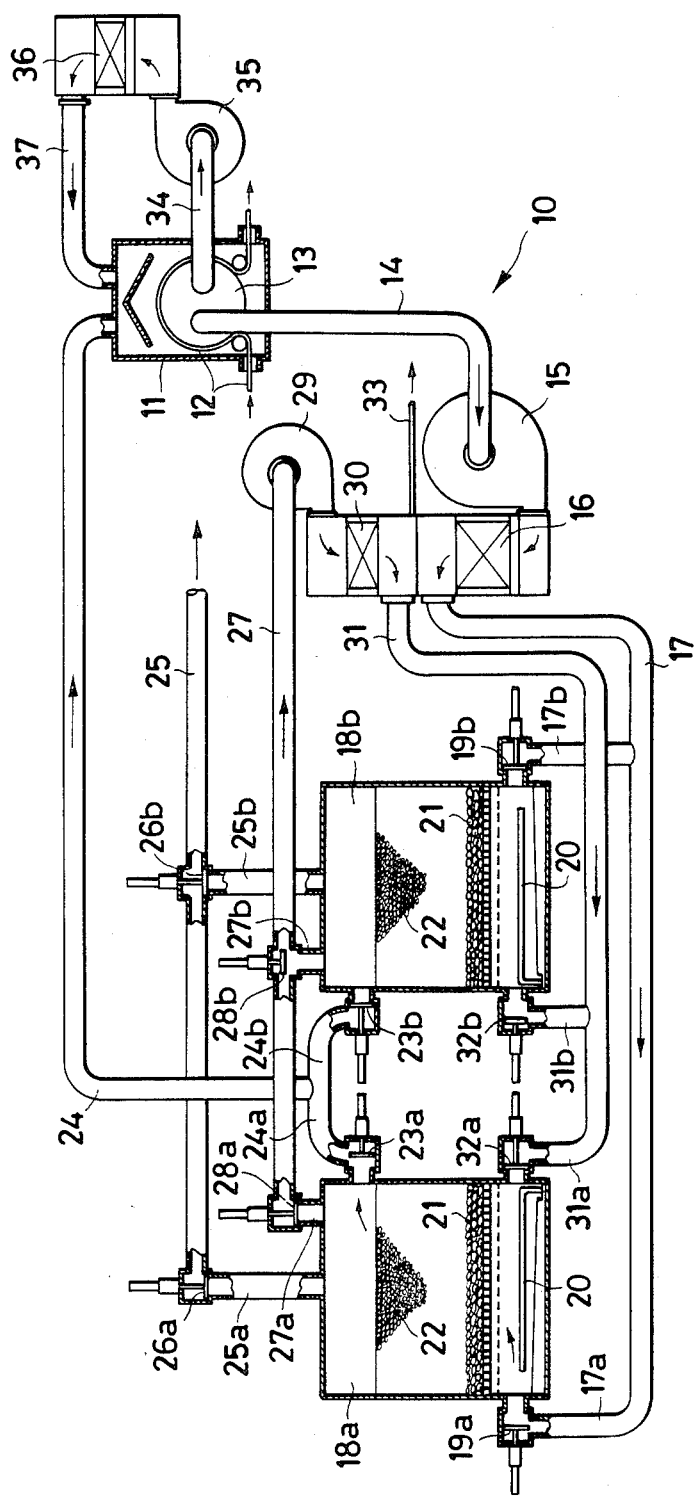

The structural and functional characteristics and the related advantages of an equipment according to the present invention shall be more evident from the following exemplifying and non limitative disclosure, referred to the related drawings, wherein:

FIG. 1 is a schematic view of an equipment according to the present invention in a first operating step, and FIG. 2 is a view equivalent to that of FIG. 1, in a second operating step.

Referring to the figures, in a plant for the treatment of fabrics with solvents (not shown), for example, off a drier, an equipment is provided for the deodorization of the fabric, and the recovery of the solvent, structured according to the present invention, and generally indicated with 10.

An element 11, acting as an air-distributing tank, receives a continuous fabric 12 wound on a perforated cylinder or drum 13.

An air suction piping 14 branches off laterally from said perforated cylinder 13 and is connected to a first fan 15, or main fan. The true deodorization loop comprises, besides the fan 15, a heat exchanger 16, which receives the air exiting the fan 15, and, after cooling it at least partly, delivers it, through a delivery pipe 17 with differentiated terminal portions 17a and 17b, to a couple of filtering elements 18a, 18b, by flowing through inlet valves 19a and 19b, positioned in the lower section of said filtering elements.

Inside each one of the said filtering elements 18a, 18b, provided are, in a parallel arrangement, from the bottom upwards: a steam emission unit 20, a packing mass 21, variously distributed, and acting as the air distributor, and a layer of activated charcoal 22.

In correspondence of their upper portion, the filtering elements 18a, 18b are connected, through valves 23a, 23b to related terminal portions 24a, 24b of an outlet piping 24, it too connected to the element 11, to close the deodorization loop.

From each filtering element 18a, 18b, furthermore piping portions 25a, 25b branch off, these too being provided with valves 26a, 26b, leading to a manifold for the recovered solvent 25, connected to a known condensation and separation unit (not shown).

From the filtering elements 18a, 18b further piping portions 27a, 27b branch off; these too are provided with related valves 28a, 28b, and lead to one single intake pipe 27 of a second fan 29, which is provided, on its outlet side, with a related heat exchanger 30, positioned on a delivery pipe 31. This latter is connected in its turn, by means of terminal piping portions 31a, 31b provided with related valves 32a, 32b, to the filtering elements 18a, 18b, beneath the packing masses 21.

The above-said fan 29, the related pipings 27 and 31 and valves 28 and 32 constitute a drying and cooling loop for the activated charcoal 22.

From the exchanger 30 a piping 33 of evacuation of the steam-solvent vapour condensate towards a known, not shown, separator unit, branches off.

While element 11 associated is furthermore a cooling loop, composed by an intake piping 34, coming from a more advanced section of the perforated cylinder 13, connected to a third fan 35, provided on its outlet side with a heat exchanger 36 installed on a delivery, loop-closing piping 37, is too connected to element 11.

The operation of an equipment according to the present invention is based on the contemporaneous operativeness of the two filtering elements 18a and 18b, for example, as shown in FIG. 1, in alternating adsorption and distillation steps.

In fact, the filtering element 18a receives, through the pipe 17, 17a, with the valve 19a being open and the valve 19b being closed, the air sucked from the fabric 12 by means of the fan 15, and cooled by the exchanger 16.

Such a cooling is carried out to the purpose of keeping charcoal 22 at its optimum operating temperature, so as to guarantee its highest efficiency throughout the solvent adsorption step.

Filtered and purified air leaves then the filtering unit through the open valve 23a, and is delivered, through pipe 24, to element 11, to be used again in the deodorization of fabric 12, and sucked again by fan 15.

At the same time, the filtering element 18b operates in distillation step, and the adsorbed solvent present in charcoal 22 is extracted by azeotropic distillation, by a steam stream supplied by the emission unit 20.

All of the valves of the filtering element 18b are closed with the exception of the valve 26b, which allows the mixture of steam and solvent vapour to outflow into the evacuation piping 25 towards a condensation, separation and recovery unit (not shown).

The duration of such a distillation step in the filtering element 18b is different from that of the contemporaneous adsorption step in the filtering element 18a, and can be characterized in particular as being about ⅔ or ¾ of the other one.

In fact, the remaining time portion is used to the purpose of activating the second fan 29 relatively to the filtering element 18b, as shown in FIG. 2, so as to dry and cool charcoal 22.

The second fan 29, which had remained inactive, is operatively connected, after the prior disinsertion of the emission unit 20, the prior closing of valve 26b, and the following opening of valves 32b and 28b, to the filtering element 18b.

By so doing, it intakes the air saturated with steam and residual solvent vapours at about 100° C., and makes it pass through the exchanger 30 provided at the inlet of the delivery piping 31.

The air is cooled, causing the mixture of steam and solvent vapours to condense; said condensate mixture can thus reach the separation unit (not shown) through the pipe 33.

From the heat exchanger 30, cold air is fed from downwards into the filtering element 18b, wherein it meets the packaging mass 21, which is at high temperature, with which it exchanges heat, being warmed again and thus getting desaturated. It passes then through the layer of charcoal 22 absorbing moisture, until it reaches again, by being intaken by the fan 29, the heat exchanger 30, thus beginning its cycle again.

The drying of charcoal 22 continues in such a way, until the packing mass 21 has lost heat, so that the air coming from the heat exchanger 30 can cool, during the progressing of the step, the charcoal 2, up to the optimum adsorption temperature.

Such a step of drying-cooling of the filtering element 18b ends at the moment the parallel adsorption step of filtering element 18a ends at, such durations being suitably pre-programmable by means of suitable apparatus, and the step change occurring automatically.

The charcoal cooling or drying step has the purpose of adequately preparing the filtering element 18b for the subsequent adsorption step, thus allowing purified air to be recycled in a closed loop, which otherways would not be possible, owing to its initial temperature, moisture and residual presence of solvent conditions.

The distribution element or tank 11 results furthermore connected, during the course of these steps, to a cooling loop, which intakes air from the same element, or, more precisely, from an advanced section of the perforated cylinder 13, cools it through the heat exchanger 36, and feeds it back directly to the already deodorized fabric 12, cooling it.

Air is thus kept at low temperature and within a closed loop.

The whole equipment according to the invention results thus to be completely under "closed loop" conditions, and eliminates any air venting to the outside.

A so structured equipment is always operating under such conditions as to guarantee a constancy of efficiency of the activated charcoal at its highest levels of practical efficiency, thus allowing the process air to be recycled and re-used, and eliminating, as a consequence, the critical peaks in the values of purified air emission typical of the known systems, and furthermore contributing to a nearly total recovery of the solvent.

On the other hand, it does not require any energy consumptions for the heating of the ambient air, which is required on the contrary by the traditional systems, inasmuch as these latter exhaust and vent to the outside air from the working rooms, such air having then to be replaced and heated again.

What is claimed is:

1. A textile processing apparatus for continuously deodorizing fabric and extracting and recovering solvents from fabric consisting essentially of an air distribution element having ports to permit the entry and exit of fabric, a main fan having its intake connected to said air distribution element and its discharge connected to at least two activated charcoal filtering elements, each activated charcoal filtering element comprising filtering materials including activated charcoal and upstream of said filtering materials a steam injection element, each activated charcoal filtering element further including at least two valved intake ports, $I_a$ and $I_b$, and at least three valved discharge ports $D_a$, $D_b$, and $D_c$, wherein the discharge of said main fan is connected at valved intake ports $I_a$, and said valved discharge ports $D_a$ are connected to said air distribution element, forming a closed main fan circulation loop from said air distribution element through the main fan, through the at least two activated charcoal filtering elements and back to said air distribution element, wherein said valved discharge ports $D_b$ are connected to the intake of a secondary fan, the discharge of which is connected to the valved intake ports $I_b$ of said at least two activated charcoal filtering elements, forming a closed secondary fan circulation loop from said secondary fan through said at least two activated charcoal filtering elements and back to said secondary fan, wherein said valved discharge ports $D_c$ provide a solvent recovery vent from said activated charcoal filtering elements to a solvent recovery apparatus, which valves of said valved intake and discharge ports are independently operable so as to permit each activated charcoal filtering element to be connected, independently, to the closed main fan circulation loop, the closed secondary fan circulation loop, or the solvent recovery vent.

2. A textile processing apparatus as defined in claim 1, wherein a heat exchanger is inserted between the discharge of said main fan and the valved intake port $I_a$.

3. A textile processing apparatus as defined in claim 1, wherein a heat exchanger is inserted between the discharge of said secondary fan and said valved intake port $I_b$.

4. A textile processing apparatus as defined in claim 1, wherein said air distribution element is also connected to the intake of a tertiary fan, the discharge of which is passed through a heat exchanger and back to said air distribution element, said air distribution element, tertiary fan and connected heat exchanger defining a closed fabric cooling loop.

5. A textile processing apparatus as defined in claim 1, wherein said activated charcoal filtering elements include, between said intake ports and said discharge ports, a steam injection element, a packing mass, and a layer of activated charcoal.

6. A textile processing apparatus as defined in claim 5, wherein the number of activated charcoal filtering elements is two, and wherein the valves are interconnected so that when one filtering element is operating on the closed main fan circulation loop, the other filtering element operates on the solvent recovery vent followed by operation on the closed secondary fan circulation loop.

7. A textile processing apparatus as defined in claim 1, wherein said air distribution element includes a perforated cylinder around or inside which fabric entering the air distribution element is passed, air suction being provided by the main fan through the cylinder perforations which is effective to deodorize and remove solvents from fabric passing around or inside said cylinder.

* * * * *